Patented Aug. 14, 1928.

1,680,827

UNITED STATES PATENT OFFICE.

THEODORE B. WAGNER, OF BROOKLYN, NEW YORK.

YEAST STIMULANTS AND PROCESS OF USING THEM.

No Drawing. Application filed June 2, 1923, Serial No. 643,065. Renewed January 13, 1928.

My invention relates to yeast stimulants, that is material tending to stimulate the catalytic action of the yeast, when mixed with dough of the kind used in making leavened bread. The object of the invention is the production of an improved yeast stimulant and the utilization thereof in bread making.

Within recent years the use of yeast stimulants has become firmly established in the manufacture of leavened bread. The main purpose of a yeast stimulant is to stimulate the catalytic action of the yeast with the result that the hitherto customary amount of yeast added to the dough may be reduced and the duration of the fermenting period shortened. The various yeast stimulants employed for such purpose, depend for their activity upon inorganic chemicals (mineral salts such as calcium sulfate, bromate of potash, etc.), which, to facilitate their incorporation with the dough, are co-mingled with flour as a carrying vehicle.

I have found that inorganic chemicals, to wit: mineral salts, as ingredients of yeast stimulants are wholly unnecessary and that a yeast stimulant of greater efficiency and free from objections in every respect, may be employed in and incorporated with the dough, resulting in a distinct improvment in the fermentation process and of the finished bread, such yeast stimulant being derived entirely from grain, more particularly from corn.

Using corn as an illustration of my procedure, I prefer to proceed in the following manner:

Corn is steeped in water, in the ratio of eight gallons of water to one bushel of corn, at a temperature of about 120° F. for a period of about 48 hours, which time suffices to extract from the corn practically all of the corn solubles. The latter consist primarily of organic phosphorus salts of the phytin type, potash, calcium and magnesium in organic combination, nitrogenous substances, largely of the proteose, peptone and amino types, also sugars, gums, lactic and other organic acids.

The essential corn solubles in so far as the purposes of this invention are concerned, are present in steep water in approximately the following amounts:

| | Per cent (dry basis) |
|---|---|
| Organic phosphorus as $P_2O_5$ | 8.00 |
| Organic potash as $K_2O$ | 6.00 |
| Organic calcium as $CaO$ | 1.50 |
| Nitrogenous matter (Nx6.25) | 44.00 |
| Organic acids, as lactic | 16.00 |

The steep water, i. e. the aqueous extract of the corn solubles is withdrawn from the steep tanks at a gravity usually between 4° and 6° Bé. This is the so-called "light" steep water; it is subsequently concentrated, preferably in vacuo, to about 20° to 25° Bé., and now becomes the "heavy" steep water.

The steep water, light or heavy as the case may be, is now mixed with an amylaceous material, which serves as an absorbent and as a carrying vehicle. Of such amylaceous materials I have employed satisfactorily wheat flour, corn starch and a modified corn starch product, as described in U. S. Letters Patent No. 855,599 granted to me on June 4, 1907, but there are various other amylaceous materials, which may be used to advantage such as tapioca flour, potato starch, etc.

The following are a few examples of the methods I may pursue in preparing my yeast food with different amylaceous materials:

*Example 1.*—I place a charge of flour in a mixing apparatus of the type known in the baking industry as a kneader; after starting the kneading blades or propeller, I add a predetermined quantity of steep water and continue the kneading until a homogeneous mass results. This mass I reduce to dryness by removing the excess moisture by applying heat in a suitable apparatus, such as a drying kiln, either the still type, or a type provided with means for forcing a current of air through it, the mass in either case having been transferred to suitable trays, before being placed in such apparatus; or, I remove the excess moisture, either under atmospheric or reduced pressure, by means of a rotating steam heated drum dryer; in this case it will be found advantageous to incorporate before drying a larger amount of water with the flour than when the drying is performed on trays. The mass is withdrawn from the apparatus when the moisture has been reduced to approximately 10 per cent; if necessary, the material is pulverized and bolted, and is then ready to be placed in commercial packages. I have obtained good results by maintaining a ratio between flour and steepwater as 4:1, calculated on dry substance basis, but I do not wish to be understood as limiting myself to such ratio.

*Example 2.*—A batch of "heavy" steepwater is withdrawn from the vacuum pan and dropped into a tank provided with an agitator in motion, whereupon I add a predetermined quantity of starch and after thorough co-mingling has taken place, I withdraw the charge from the tank, pass it through filter presses and convey the filter press cakes to a suitable apparatus for finishing the drying, such as a drying kiln equipped with trays, as above described. Instead of the "heavy" steepwater, I may use "light" steepwater, an excess of which, as in the case of the "heavy" steepwater, is removed by filterpressing and returned to the regular steepwater channel (gluten feed), but in the case of the light steepwater, I prefer, for drying, a spray drying device, such as I have described in my application, Serial No. 488,380, filed July 29, 1921, and pertaining to maltose-containing material and process of producing same. It is understood, of course, that any similar apparatus will serve the purpose as well.

*Example 3.*—Steepwater, either light or heavy is reduced to dryness, preferably in a spray drying apparatus and the dried steepwater thus obtained is mixed with the modified starch product described in U. S. Letters Patent No. 855,599, granted to me on June 4, 1907.

It is obvious that I may mix flour, starch or any other amylaceous material with the dried steepwater in the manner described or any other suitable manner. The dried steepwater is markedly hygroscopic but the amylaceous materials which I propose using, serve as effective absorbents and being nonhygroscopic in themselves, stable products are obtained.

It is also obvious, that whenever necessary to fit the product for the market, recourse may be had to pulverizing and bolting, so as to give the finished product practically the same degree of fineness as obtaining in standard grades of commercial flour.

My yeast stimulant is distinguished from all other yeast foods not only by the fact that it is derived wholly from organic sources, but particularly by its content of organic acids, chiefly lactic. The importance of lactic and similar organic acids lies in the fact that these acids are the active agents in the softening of the gluten, which is one of the essential features of the bread-making process. A further advantage of lactic acid as contained in my yeast stimulant, is found in its tendency to prevent "rope" in the dough and the finished bread. Although I have used corn solubles as an illustration, my invention is not limited to the steepwater obtained from corn, as steepwater made from any other food grains may be used instead, such other grains being the equivalent of the corn referred to in my claims.

What I claim is:

1. As a new article of manufacture for use in connection with yeast containing dough, a yeast stimulant consisting of a mixture of amylaceous material and the dried solubles contained in corn steepwater.

2. In the manufacture of leavened bread, the improvement which consists in adding to the yeast-containing dough a mixture of amylaceous material and the dried solubles contained in corn steepwater.

In testimony whereof I have hereunto set my hand.

THEODORE B. WAGNER.